United States Patent [19]

Mathou

[11] 4,005,559
[45] Feb. 1, 1977

[54] ASSEMBLING PIECE AND APPLICATION TO A PANEL ASSEMBLY

[76] Inventor: Marcel Edouard Mathou, Rte. de Cantaranne Zone Industrielle, 12000 Rodez, France

[22] Filed: June 9, 1975

[21] Appl. No.: 584,876

[30] Foreign Application Priority Data

June 13, 1974 France .............................. 74.20567

[52] U.S. Cl. .................................. 52/282; 52/585; 52/285
[51] Int. Cl.² ......................................... E04F 19/06
[58] Field of Search ............ 52/243, 585, 280, 282, 52/656, 238, 272, 285, 489, 758 H, 753 D, 753 Y, 753 E, 753 J; 160/380, 351, 371, 374.1

[56] References Cited

UNITED STATES PATENTS

| | | | |
|---|---|---|---|
| 719,435 | 2/1903 | Chambers | 52/282 |
| 760,974 | 5/1904 | Dyarman et al. | 52/282 |
| 828,523 | 8/1906 | Springer | 52/282 |
| 1012,708 | 12/1911 | Reid | 52/282 |
| 1,170,659 | 2/1916 | Morris | 52/282 X |
| 1,590,890 | 6/1926 | Easterman | 52/282 |
| 2,924,638 | 2/1960 | Feketies | 52/285 X |
| 2,969,268 | 1/1961 | Mason et al. | 52/282 X |
| 3,129,472 | 4/1964 | Hensel | 52/585 X |
| 3,370,871 | 2/1968 | Piarotto | 52/753 R |
| 3,751,127 | 8/1973 | Black, Jr. | 52/282 X |

FOREIGN PATENTS OR APPLICATIONS

| | | | |
|---|---|---|---|
| 152,582 | 7/1953 | Netherlands | 52/212 |
| 145,217 | 5/1954 | Sweden | 52/282 |

Primary Examiner—Alfred C. Perham
Assistant Examiner—Leslie Braun
Attorney, Agent, or Firm—Kurt Kelman

[57] ABSTRACT

The present invention relates to an assembling piece for assembling panels.

The assembling piece according to the present invention comprises at least two wings, at least two abutting surfaces perpendicular to the inner surface of said wings, at least two pins 12 perpendicular to the surface of said wings and extending on the same side as said wings; at least two panels 16 are mounted on said pins and maintained through a clamp secured in a hole 14.

According to a particular embodiment, the assembling piece comprises a flat outer portion 15 enabling to secure two identical assembling pieces along their flat portions. The present invention can be used in particular for manufacture of furniture.

8 Claims, 6 Drawing Figures

ASSEMBLING PIECE AND APPLICATION TO A PANEL ASSEMBLY

BACKGROUND OF THE INVENTION

1. Field of the Invention

The present invention relates to an assembling piece and more particularly to an application of said assembling piece for assembling at least two panels.

2. Description of the Prior Art

According to the known prior art, a set of two panels forming an angle is obtained either directly by assembling said panels by means of screws, or by assembling said panels by means of an assembling piece. In the latter case, panels are provided with holes on the end faces of the panels, said holes being parallel to the panel and the assembling piece being formed with pins corresponding to the holes, the set being maintained by sticking. Such systems have the main drawback that they are not at all flexible and in case of shock or if a force is applied perpendicularly to one of said panels, a break usually occurs at the junction.

SUMMARY OF THE INVENTION

An object of the present invention is to eliminate said drawbacks and to provide assembling of two panels forming an angle by means of an assembling piece permitting quick setting or unsetting of the panels, a flexibility of the junction obtained and also a good holding of the panels when mounted.

According to an aspect of the present invention, the panel assembling piece comprises wings parallel to the final position of assembled panels and forming, with respect to one another, an angle corresponding to the desired angle of the panels. The wings are provided with perpendicular pins corresponding to holes provided within the panels perpendicularly to their end face. For setting of the panels, said panels are mounted on the pins and assembled by means of a clamp maintained by a screw secured in the assembling piece. According to a particular feature of the present invention, the clamp is made of a material which is flexible according to a direction perpendicular to its plan but substantially not flexible according to a direction parallel to its plan.

According to another particular feature of the present invention, the assembling piece may be molded integrally with the pins or may be a profile cut into pieces according to the desired length, studs being fixed in the profile obtained. According to another embodiment of the present invention, the assembling piece is provided with tubular sleeves inwardly threaded and the assembling clamp is secured on the panels by means of screws prior to the tightening of said clamp on said assembling piece.

Another object of the present invention is to provide an assembling piece according to embodiments enabling to form sets of panels of different dimensions with good resistance characteristics to forces applied on said sets of panels.

These objects are obtained through the provision of a flat portion on the outward surface of the assembling piece perpendicular to the securing screws for the clamp and enabling association of two similar assembling pieces to obtain a set of four panels.

According to another embodiment of the present invention an assembling piece is provided having a modified structure enabling assembling of three panels.

According to another characteristic of the present invention unlimited sets of panels can be obtained by means of assembling pieces according to the present invention, said sets further comprising stiffening panels positioned so as to take advantage of the characteristics of the assembling piece according to the present invention.

BRIEF DESCRIPTION OF THE DRAWINGS

Other objects, advantages and applications of the present invention will be made apparent by the following detailed description of the preferred embodiments of the invention. The description makes reference to the accompanying drawings in which.

BRIEF DESCRIPTION OF THE PREFERRED EMBODIMENTS.

In the following description, adjectives like horizontal and vertical will be used only for the sake of clarity in connection with the drawings, it will be clear that such adjectives shall not limit the scope of the present invention since the assembling pieces can be used for assembling of either vertical or horizontal panels.

Figure 1:
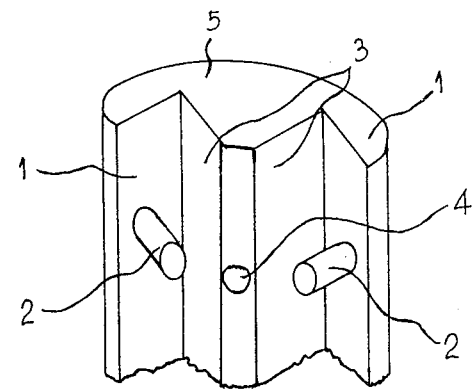
FIG. 1 is a perspective view of a portion of the assembling piece according to the present invention.

On FIG. 1, it is shown a perspective view of the assembling piece from the inward of the angle formed after setting of the panels. The assembling piece according to the present invention comprises two wings 1, the inner surface of which forms an angle which will be the final angle of the mounted panels. In the embodiment shown, the angle is a right angle, but it will be understood that any desired angle may be obtained, provided that the corresponding assembling piece is manufactured. The assembling piece further comprises two pins 2 perpendicular to the wings and extending from the inner surface of said wings toward the interior of the angle formed by the wings. The inner surface of the assembling piece also comprises two surfaces 3 perpendicular to the inner surface of the wings 1 and providing abutting surfaces for panels as it will be explained later. Said abutting surfaces 3 are spaced from the pins 2 toward the apex of to the angle formed by the inner surfaces of the wings 1. The assembling piece further comprises a threaded hole 4 positioned between the pins in a plane bisecting the angle of the wings. The assembling piece is made from a rigid material such as metal or rigid plastic material, the wings do not bend when forces are applied on the panels.

The assembling piece will be referenced in the following as the piece 5.

Only a portion of the assembling piece has been shown on the drawing. It will be noted that the assembling piece will have a length corresponding to the length of the panels to be assembled and will comprise a number of pins 2 and hole 4 sufficient to provide a convenient holding of the panels when mounted.

It will also be noted that the outer surface of the assembling piece is shown smooth but may have any desired form in particular with any sort of embellishment.

Figure 2:
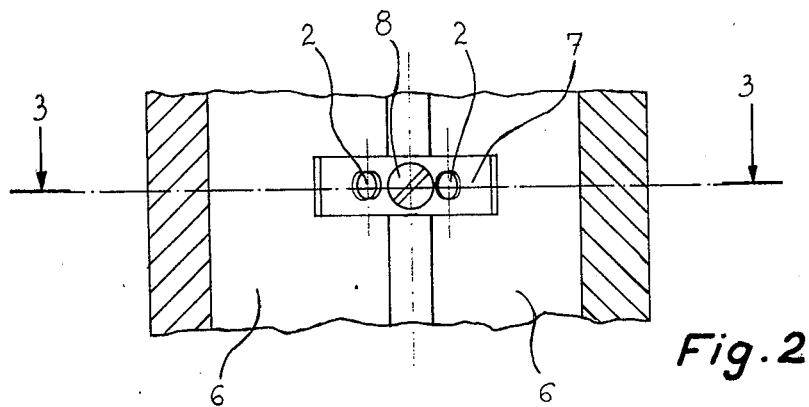
FIG. 2 is an elevational view of the structure obtained after setting the two panels.
Figure 3:
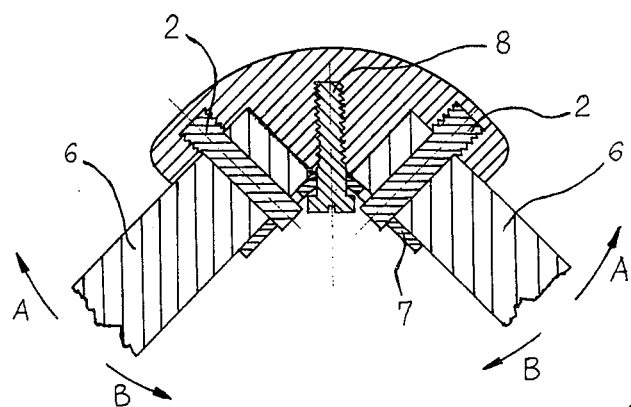
FIG. 3 is a cross section according to line 3—3 of FIG. 2.

On FIGS. 2 and 3, an elevational view and a cross-section are shown respectively of an angle formed by two assembled panels. The pins shown are in the form of studs 2 secured in the assembling piece. Panels 6 are mounted on the studs 2 through holes perpendicular to the plan of panels and provided at the distance from the edge of the panel so that each panel is mounted with its end surface bearing against the corresponding abutting surface 3. The length of studs 2 is provided so that said studs break through the surface of the panels 6 when same are mounted. A clamp 7 is set in place on the ends of studs 2 and secured by a screw 8 screwed in the threaded hole 4. The axis of the threaded hole 4 corresponds to the bisectrix of the angle formed by the axis of studs 2. The clamp 7 is made of a material flexible according to the direction perpendicular to its surface but rigid according to a direction parallel to its surface. In the embodiment shown, the clamp 7 therefore has a flexibility and a resiliency permitting to adapt same to the angle formed by the panels 6 and simultaneously a sufficient rigidity against forces applied parallel to surfaces of panels 6. When the screw 8 is secured, the free ends of the studs 2 will therefore be laterally drawn towards the abutting surfaces 3 and the end surfaces of panels 6 will be strongly applied against the abutting surfaces 3. The clamp 7 may be formed from a sheet of spring steel and in such a case will be manufactured in the form of a rectangular piece provided with three holes corresponding to studs 2 and screw 8. The holes for the studs 2 may be elongated apertures as shown on FIG. 2, the distal edge of said apertures with respect to the central hole being provided at a distance such that said distal edge bears against the studs 2 when the clamp is secured by a screw 8.

The set provided by the piece according to the present invention is particularly efficient: as a matter of fact when forces according to arrows A shown on FIG. 3 are applied to the panels, the clamp 7 maintains a rigid junction on the pins 2 preventing an outward movement of the panels. When forces according to arrows B shown on FIG. 3 are applied, the assembling piece 5 is solicited and prevents through its rigidity any movement of the panels. Such a system is furthermore easily setted or unsetted since no piece is damaged when mounted. The embodiment disclosed may be subject to numerous modifications which will fall within the scope of the present invention. For example, studs 2 can be set in place directly when molding the piece 5 or on the contrary may be introduced from the outward surface through holes provided in the wings of the assembling piece 5.

According to another embodiment, the piece 5 may be provided with tubular sleeves instead of studs 2 and, if necessary, inwardly threaded. The panels are then mounted on the outer surface of the tubular sleeves and screwed. A milled screw is, for example, introduced from the inner side of the angle. In such a case the tubular sleeves are slightly shorter than the thickness of the panel to be assembled and the clamp is secured on the panel by means of screws before securing the central screw 8.

The use of milled screws is particularly advantageous since it provides a good distribution of forces which maintain the panel 6 against the inner surface of the wings 1 of the assembling piece 5 and of forces which apply each panel 6 against the corresponding abutting surface 3.

When screws are introduced from the outer surface of the assembling piece 5, the assembling piece may also be provided with a hole with a shoulder so that the head of the screw will not break through the outer surface of the assembling piece.

Figure 4:
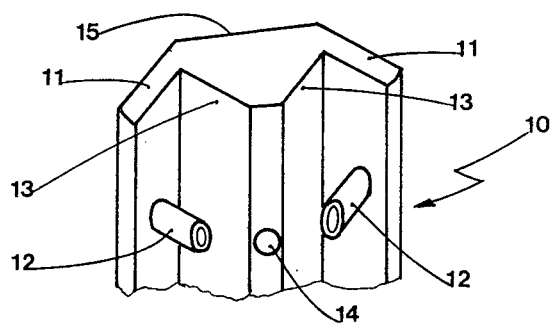
FIG. 4 is a perspective view of another embodiment of the assembling piece according to the present invention.

According to the embodiment shown on FIG 4, the assembling piece according to the present invention comprises, like the assembling piece disclosed in connection with FIG. 1, two wings 11 forming a desired angle, and carrying pins 12 perpendicular to the inner surfaces of the wings.

The inner surface of the assembling piece also comprises two abutting surfaces 13 perpendicular to the wings and forming a body having an aperture 14 provided for securing means for the clamp as disclosed above. The embodiment shown on FIG. 4, generally referenced at 10, further comprises an outer flat surface 15 provided perpendicular to the axis of the opening 14 and permitting association of two assembling pieces 10 for assembling four panels as it will be explained in connection with FIG. 5.

Figure 5:
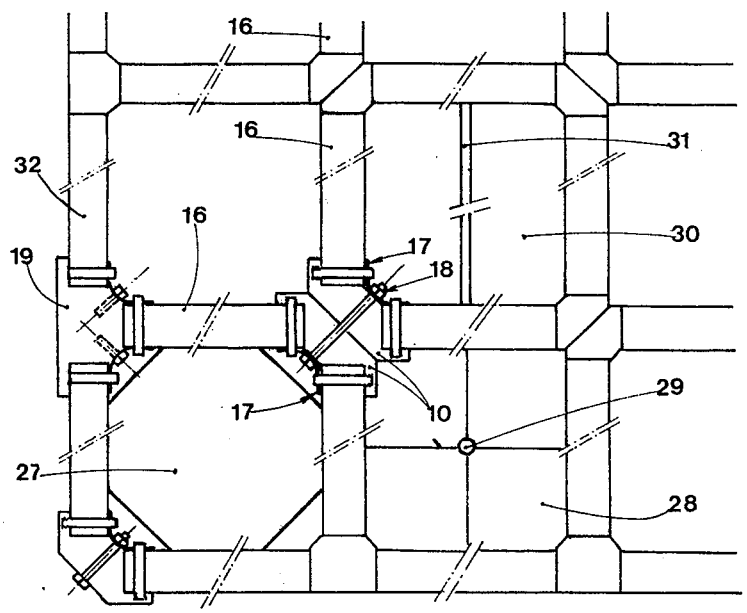
FIG. 5 is an elevational view of a part of a set of panels and, FIG. 6 is an end view of an embodiment of the present invention for assembling three panels.

FIG. 5 shows a front view of a set of panels provided by means of assembling pieces such as disclosed in connection with FIG. 4, a number of them being schematically shown. For assembling four panels in the middle of the set, two assembling pieces 10 are used, the faces 15 of which bear against one another. Panels 16 are set in place on pins 12 and clamps 17 are positioned on the end of the pins 12. The clamps are no longer maintained as disclosed above by means of a screw secured in the opening but by a bolt 18 passing through both pieces 10, each end of the bolt 18 being used for tightening the corresponding clamp 17 and the bolt 18 itself acting for assembling the two assembling pieces 10 to form a rigid set of four panels.

The assembling of four panels can therefore be realized an infinite number of time, enabling to obtain a set of compartments, or divisions, having a square or rectangular cross-section according to the respective length of the panels. It will also be noted that when the wings of the assembling pieces are not at right angle but form any desired angle, a set of panels may be obtained with divisions which are no longer square or rectangular but may have any variegated forms. In such a case it will be necessary to manufacture different assembling pieces having supplementary or complementary angles according to the pattern to be realized.

Figure 6:
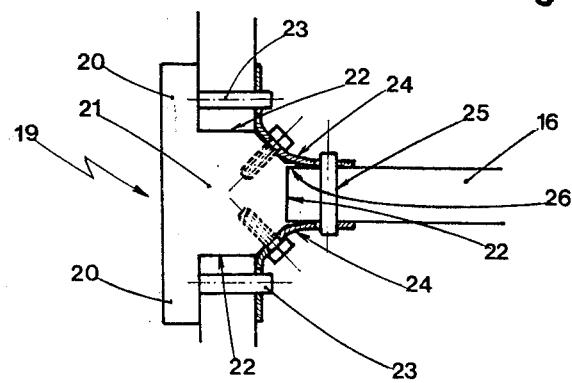

It will be noted that it is also necessary to provide particular embodiments of assembling pieces for panels positioned at the limit of the set, such as panel 32. As shown on FIG. 5, a particular assembling piece 19 is provided for assembling three panels, two of which form the outer surface of the set. An end view of an assembling piece 19 is shown on FIG. 6. Said assembling piece 19 comprises wings 20 and a body 21 comprising three abutting surfaces 22 forming surfaces perpendicular to the end surfaces of the panels to be assembled. The wings 20 comprise pins 23 perpendicular to the inner surface of the wings. In the present embodiment, the clamp 24 no longer associates two pins of the assembling piece but one of said pins with a peg 25 positioned through the third panel to be assembled, each end of the peg 25 enabling setting of a clamp 24 so that after securing the clamps by means of screws secured in the body 21, the three panels are conveniently assembled.

It will be noted that at the corner of an assembly as shown on FIG. 5, an assembling piece 10 can be provided, as shown, or an assembling piece with a smooth surface as disclosed with respect to FIGS. 1 to 3.

It is not absolutely necessary to provide a particular assembling piece of the type of the piece 19. If desired, only assembling pieces of the type 10 can be used, panels like panel 32 being withdrawn and the other panels being assembled by means of assembling pieces such as corner piece 10. In such a case, and in order to maintain a convenient resistance of the assembly, the panel 32 can be replaced by elements formed in place of the panel such as small billets or tubular elements vertically positioned.

It will be noted that the body 21 of the piece 19 may have flanges 26 making easier the setting of the corresponding panel 16. In the case the angles between panels are not right angles, and when several panels converge toward one another, an assembling piece comprising as many abutting faces as panels to be assembled can be provided having elsewhere the structure of piece 19, a clamp being provided between each pair of panels and fixed according to the bisectrix of the angle formed by the panels.

The assembling pieces can be made from a profile in which studs are fixed acting as pins, or directly integrally molded from plastic material as underlined above.

When it is desirable to realize a set withstanding to important efforts, stiffening panels may be provided in addition to the assembling pieces disclosed above. Said stiffening panels being positioned within the divisions perpendicularly to the walls of said divisions. In order that the stiffening panels be efficient, it is necessary that they bear on the walls of the set. It will be noted in this respect that contrarily to devices in the prior art, where a pressure against the walls generally damages the assembling means, the assembling pieces according to the present invention are particularly adapted to use of stiffening panels forced with the divisions since the component force will be applied according to the bisectrix of the angle that is according to a direction where the assembling piece is particularly resistant.

The setting of stiffening panels may be realized according to different operating modes, three of which being shown on FIG. 5. According to a first embodiment, a single panel is provided such as panel 27 of FIG. 5. Said panel having generally the form of the division in which it will be introduced and the corners of which being cut in order to enable introduction of a stiffening panel perpendicularly to the walls of the division without abutment against the assembling pins. It will be noted that in said embodiment, the panel may be positioned at any desirable depth within the division so that when the assembly does not bear against a wall, the position of the stiffening panel enables to define two divisions of adaptable depth from one original division. According to the embodiment shown at 28, the stiffening panel is cut into four elements, the total dimension of which is slightly smaller than the dimension of the division in which it will be introduced. Said elements of stiffening panel being maintained, after introduction, against the walls of the division by means of a distance piece 29 such as a resilient tubular rubber sleeve passing through the stiffening panel at its center and axially compressed, therefore providing a radial extension of the sleeve and pressing the parts of the stiffening panel against the side walls of the division.

According to another embodiment of the present invention, a stiffening panel 30 is provided which comprises two parts set in place at the end of the division of the assembly and pressed against the wall of said division through a distance means such as a I-shaped rod 31 inserted between the two parts of the stiffening panel. In such a case, a notch can be provided at the edge of one of the panels 16 forming the walls of the division, said notch enabling the introduction of the rod 31 longitudinally within the space between the two parts of stiffening panel.

In the case a stiffening panel is used, the clamps 24 associated to the assembling pieces 10 may be withdrawn. As a matter of fact, the force applied on the lateral walls of the division will maintain the panels on the pins and the clamp is no longer necessary. Short pins can then be provided which do not break through the panels in the mounted position so that the esthetic aspect of the assembly is improved.

Having thus disclosed my invention, what I claim is:

1. An assembling system comprising:
   a. an assembling piece having two wing surfaces forming an angle and two abutting surfaces perpendicular to said wing surfaces respectively, said angle having an apex;
   b. two elongated pins projecting perpendicularly from said wing surfaces respectively and being spaced from the associated abutting surfaces in a direction away from said apex, each pin having a free end remote from the associated wing surface;
   c. a clamp mounted on the free ends of said two pins; and
   d. securing means connecting said clamp to said assembling piece for urging said clamp toward said apex.

2. A system according to claim 1, wherein said assembling piece is formed with an aperture therethrough in a plane bisecting said angle, said securing means including a securing member received in said aperture and fastened to said clamp intermediate said free ends.

3. A system according to claim 2, wherein said piece has a flat face perpendicular to said aperture and directed away from said wing surfaces and said abutting surfaces.

4. An assembling system, comprising an assembling piece having two wings forming an angle, at least two abutting surfaces perpendicular to the wings, at least two pins extending perpendicular to the wings on the same side as the abutting surfaces, with respect to the wings, at least one aperture in said assembling piece, at least two panels mounted on said pins, at least one clamp mounted on the free end of said pins and maintained by securing means associated to said apertures in said assembling piece.

5. A system according to claim 4, wherein the clamp is made from a material which is flexible according to a direction perpendicular to the plan of said clamp and rigid according to a direction parallel to the plan of said clamp.

6. A system according to claim 4, wherein pins are studs secured in the assembling piece and the length of which is greater than the thickness of said panels supported by said pins.

7. A system according to claim 4, wherein the pins are tubular sleeves, the length of which is smaller than the thickness of said supported panels, said clamp being maintained on said sleeves through securing means.

8. A system according to claim 7, wherein said securing means are milled screws.

* * * * *